United States Patent [19]

Ito et al.

[11] Patent Number: 5,292,696
[45] Date of Patent: Mar. 8, 1994

[54] HYDROCARBON ADSORBING BODY

[75] Inventors: Tetsuo Ito, Fujisawa; Hiroyuki Kanesaka, Yokohama, both of Japan

[73] Assignee: Nissan Motor Company, Limited, Japan

[21] Appl. No.: 945,784

[22] Filed: Sep. 15, 1992

[30] Foreign Application Priority Data

Sep. 18, 1991 [JP] Japan .................. 3-238082

[51] Int. Cl.⁵ ............................................. B01J 29/06
[52] U.S. Cl. ........................................ 502/66; 502/63; 502/64; 502/67; 502/71; 502/77
[58] Field of Search ............... 502/63, 64, 66, 67, 502/77, 71

[56] References Cited

U.S. PATENT DOCUMENTS

| | | | |
|---|---|---|---|
| 3,758,402 | 9/1973 | Oleck et al. | 502/67 |
| 4,862,836 | 9/1989 | Chen et al. | 502/253 |

FOREIGN PATENT DOCUMENTS 3-238082  9/1991  Japan .

*Primary Examiner*—Patrick P. Garvin
*Assistant Examiner*—Brent M. Peebles
*Attorney, Agent, or Firm*—Lowe, Price, LeBlanc & Becker

[57] ABSTRACT

A hydrocarbon adsorbing body for use in the purification of exhaust gas comprises a monolith type carrier, a coating layer of Pd ion-exchanged H-type ZSM-5 zeolite powder, and a coating layer of zeolite powder other than the above zeolite.

16 Claims, No Drawings

HYDROCARBON ADSORBING BODY

BACKGROUND OF THE INVENTION

1. Field of the Invention

This invention relates to a hydrocarbon (HC) adsorbing body suitable for use in an apparatus for purifying exhaust gas from an internal combustion engine in automobiles and the like.

2. Description of the Related Art

In order to purify the exhaust gas from the internal combustion engine in the automobile or the like, there are presently used pellet or monolith catalysts. The exhaust gas includes hydrocarbon (HC), carbon monoxide (CO) and nitrogen oxides (NOx) as a harmful component. Particularly, the catalytic purification performance of HC is strongly influenced by the temperature of the exhaust gas, so that HC is generally purified through a noble metal catalyst at a temperature above 300° C.

When the temperature of the exhaust gas is low immediately after the start of the engine, therefore, it is difficult to purify HC through the catalyst. Moreover, a large amount of HC is discharged immediately after the start of the engine and a ratio of low-temperature HC (hereinafter referred to as cold HC) occupied in the exhaust gas is large, so that it becomes serious to control the discharge of cold HC.

In order to reduce the amount of cold HC at the time of engine start, there is proposed an apparatus for the purification of exhaust gas in Japanese Patent laid open No. 2-135126.

In this apparatus, however, a carrier is coated with zeolite and then a metal is carried thereon, so that ion exchange is insufficient. Further, since Y-type zeolite or mordenite is used as the zeolite, the adsorption ability is insufficient. Moreover, the zeolite is high in the temperature dependence and preferentially adsorbs water in the exhaust gas over a temperature range from room temperature up to about 100° C., so that it can not be said that the ability of adsorbing cold HC is sufficient.

SUMMARY OF THE INVENTION

It is, therefore, an object of the invention to provide a hydrocarbon adsorbing body for use in an exhaust gas purification apparatus having improved adsorption ability for hydrocarbon, particularly adsorption ability in a low- temperature exhaust gas.

According to the invention, there is the provision of a hydrocarbon adsorbing body for adsorbing hydrocarbon from an exhaust gas, comprising a monolith type carrier, a coating layer of H-type ZSM-5 zeolite powder ion-exchanged with palladium, and a coating layer of zeolite powder other than the above zeolite.

In the production of the adsorbing body according to the invention, the H-type ZSM-5 zeolite powder ion-exchanged with Pd is fired at a high temperature, for example, 600°-750° C. and then coated on the monolith type carrier, or it is applied to the monolith type carrier and then fired at the high temperature within the above range. Moreover, either the coating layer of H-type ZSM-5 zeolite powder ion-exchanged wit Pd or the coating layer of zeolite other than the above zeolite may be formed as an undercoat layer.

DESCRIPTION OF THE PREFERRED EMBODIMENTS

Zeolites are crystalline and porous substances having uniform and fine pores and have such a property that only molecules capable of passing through the pore are selectively adsorbed from a mixture containing such molecules in the pores. Therefore, if it is intended to adsorb cold HC discharged at the time of engine start, the above property of zeolite prevents the increase of HC mission at a temperature region causing no catalytic reaction. Furthermore, the HC adsorption ability of zeolite is dependent upon the temperature of the exhaust gas. In this connection, the inventors have found that the HC adsorption ability is more improved by separately forming a layer of Pd/HZSM 5 zeolite formed by varying firing temperature and time after the ion exchange with Pd and a layer of zeolite other than the above zeolite, e.g. Cu/HZSM-5 zeolite ion-exchanged with Cu on the same monolith type carrier. Particularly, when Pd/HZSM-5 zeolite is fired at a temperature of not lower than 600° C., preferably 600°-750° C. in air for not less than 2 hours, preferably 2–4 hours, the moderate removal of alumina from zeolite is caused to improve the hydrophobic property of zeolite, while the ion-exchanged noble metal is held at a more stable state in the active site of zeolite as a uniform composite oxide. Furthermore, the HC adsorption ability is improved by separately forming the layers of H-type ZSM-5 zeolites ion-exchanged with Pd and Cu. Especially, when Cu/HZSM-5 zeolite layer is formed as a surface layer, it preferentially adsorbs water from the exhaust gas, so that Pd/HZSM-5 zeolite layer as an inner layer is hardly influenced by water and hence the adsorption ability of cold HC from room temperature is more improved.

The following examples are given in illustration of the invention and are not intended as limitations thereof. In these examples, part is by weight otherwise specified.

EXAMPLE 1

Into a porcelain pot were charged 100 parts of H-type ZSM-5 zeolite ion-exchanged with Pd (hereinafter abbreviated as Pd/HZSM-5), 65 parts of silica sol (solid content: 20%) and 65 parts of water, which were mixed and pulverized in an oscillation mill for 40 minutes or in a universal ball mill for 6.5 hours to prepare a wash coat slurry. After a monolith type carrier of cordierite was subjected to a water absorption treatment through a suction coating process, the resulting slurry was poured onto a full section of the carrier and then excessive amount of the slurry was removed through the suction coating process. Thereafter, the thus treated carrier was dried and calcined at 400° C. for about 1 hour, whereby Pd/HZSM-5 zeolite was coated onto the carrier at a coating amount of about 90 g/l.

The wash coating, drying and calcination were repeated once to coat 130 g/l in total of Pd/HZSM-5 zeolite onto the carrier, which was then fired at 650° C. in air for 4 hours.

Separately, a wash coating slurry was prepared by using H-type ZSM-5 zeolite ion-exchanged with Cu (hereinafter abbreviated Cu/HZSM-5) in the same manner as described above, which was coated onto the layer of Pd/HZSM-5 zeolite in the same manner as described above and dried and fired to form 70 g/l of a coating layer of Cu/HZSM-5 zeolite (adsorbing body 1).

EXAMPLE 2

Onto the monolith type carrier was coated 130 g/l of Pd/HZSM-5 zeolite from the same wash coating slurry as prepared in Example 1 by the same method as in Example 1, which was fired at 650° C. in air for 4 hours. Then, H-type ZSM-5 zeolite powder was used and treated in the same manner as in Example 1 to prepare a wash coating slurry, which was coated onto the coating layer of Pd/HZSM-5 zeolite at a coating amount of 70 g/l in the same manner as in Example 1 and fired at 400° C. in air for 1 hour (adsorbing body 2).

EXAMPLE 3

Onto the monolith type carrier was coated 130 g/l of Pd/HZSM-5 zeolite from the same wash coating slurry as prepared in Example 1 by the same method as in Example 1, which was fired at 650° C. in air for 4 hours. Then, Y-type zeolite powder ion-exchanged with Cu was used and treated in the same manner as in Example 1 to prepare a wash coating slurry, which was coated onto the coating layer of Pd/HZSM-5 zeolite at a coating amount of 70 g/l in the same manner as in Example 1 and fired at 400° C. in air for 1 hour (adsorbing body 3).

EXAMPLE 4

Onto the monolith type carrier was coated 130 g/l of Pd/HZSM-5 zeolite from the same wash coating slurry as prepared in Example 1 by the same method as in Example 1, which was fired at 650° C. in air for 4 hours. Then, molecular sieve powder ion-exchanged with Cu was used and treated in the same manner as in Example 1 to prepare a wash coating slurry, which was coated onto the coating layer of Pd/HZSM-5 zeolite at a coating amount of 70 g/l in the same manner as in Example 1 and fired at 400° C. in air for 1 hour (adsorbing body 4).

EXAMPLE 5

A wash coating slurry was prepared from Pd/HZSM-5 zeolite powder fired at 650° C. in air for 4 hours in the same manner as in Example 1 and coated onto the monolith type carrier at a coating amount of 130 g/l by the same method as in Example 1, which was fired at 400° C. in air for 1 hour. Then, Cu/HZSM-5 zeolite powder was used and treated in the same manner as in Example 1 to prepare a wash coating slurry, which was coated onto the coating layer of Pd/HZSM-5 zeolite at a coating amount of 70 g/l and dried and fired in the same manner as in Example 1 (adsorbing body 5).

EXAMPLE 6

A wash coating slurry was prepared from Cu/HZSM-5 zeolite powder fired at 400° C. in air for 2 hours in the same manner as in Example 1 and coated onto the monolith type carrier at a coating amount of 130 g/l by the same method as in Example 1, which was fired at 400° C. in air for 1 hour. Then, Pd/HZSM-5 zeolite powder fired at 650° C. in air for 4 hours was used and treated in the same manner as in Example 1 to prepare a wash coating slurry, which was coated onto the coating layer of Cu/HZSM-5 zeolite at a coating amount of 70 g/l and dried and fired in the same manner as in Example 1 (adsorbing body 6).

COMPARATIVE EXAMPLE 1

Into a porcelain pot were charged 100 parts of H-type ZSM-5 zeolite treated with dinitrodiamine platinum (Pt/HZSM-5), 65 parts of silica sol and 65 parts of water, from which a wash coating slurry was prepared in the same manner as in Example 1. Then, the slurry was coated on the same monolith type carrier at a Pt/HZSM-5 coating amount of 200 g/l in the same manner as in Example 1 (adsorbing body 7).

COMPARATIVE EXAMPLE 2

Into a porcelain pot were charged 100 parts of H-type ZSM-5 zeolite treated with rhodium nitrate (Rh/HZSM-5), 65 parts of silica sol and 65 parts of water, from which a wash coating slurry was prepared in the same manner as in Example 1. Then, the slurry was coated on the same monolith type carrier at a Rh/HZSM-5 coating amount of 200 g/l in the same manner as in Example 1 (adsorbing body 8).

In the above examples, arbitrary carrier such as monolith type carrier, metal carrier or the like may be used.

Adsorption Test

A model gas test was made with respect to each of the adsorbing bodies (1–8) in Examples 1–6 and Comparative Examples 1–2 under the following conditions to measure HC adsorbed amount. The measured results are shown in Table 1.

Volume of adsorbing body: 60 cc
Total gas flowing amount: 50 l/min
HC amount: 1000 ppm
$H_2O$ content: 10%
NO amount: 1000 ppm
CO amount: 6000 ppm
$O_2$ amount: 6000 ppm
$H_2$ amount: 2000 ppm

TABLE 1

| Adsorbing body used | HC purification ratio (%) | | | Remarks |
| --- | --- | --- | --- | --- |
| | 100° C. | 200° C. | 300° C. | |
| 1 | 92 | 87 | 77 | Example 1 |
| 2 | 75 | 71 | 67 | Example 2 |
| 3 | 80 | 76 | 67 | Example 3 |
| 4 | 73 | 70 | 66 | Example 4 |
| 5 | 91 | 87 | 76 | Example 5 |
| 6 | 83 | 78 | 71 | Example 6 |
| 7 | 5 | 44 | 64 | Comparative Example 1 |
| 8 | 5 | 45 | 62 | Comparative Example 2 |

As mentioned above, the hydrocarbon adsorbing body according to the invention comprises a coating layer of ZSM-5 zeolite powder ion-exchanged with Pd and a coating layer of zeolite powder other than the above zeolite as an adsorbing member formed on the monolith type carrier for adsorbing hydrocarbon from the exhaust gas, whereby the adsorption ability of hydrocarbon at a low exhaust gas temperature is particularly improved. Therefore, when the apparatus for the purification of the exhaust gas is comprised of a catalyst for the purification of the exhaust gas and an adsorbing body for the adsorption of hydrocarbon arranged before the catalyst, it is hardly influenced by water in the exhaust gas and hence the sufficient HC adsorption ability is obtained at a temperature region ranging from room temperature to higher temperature, which effectively contributes to the purification of the exhaust gas.

We claim:

1. In an exhaust treating body for adsorbing hydrocarbons from an internal combustion engine exhaust gas, the improvement wherein a monolith carrier is coated with a first layer of HZSM-5 zeolite powder ion-exchanged with palladium, which in turn is overcoated with a coating layer of a zeolite powder other than that of the first coating layer.

2. The exhaust treating body of claim 1 wherein the overcoat layer is selected from th group consisting of HZSM-5 zeolite ion-exchanged with copper, Y zeolite ion-exchanged with copper molecular sieve powder ion-exchanged with copper, and HZSM-5 zeolite.

3. The exhaust treating body of claim 1, wherein the overcoat layer is HZSM-5 zeolite powder ion-exchanged with copper.

4. In an exhaust treating body for adsorbing hydrocarbon from an internal combustion engine exhaust gas, the improvement wherein a monolith carrier is coated with a first coating layer of a zeolite powder, which in turn is overcoated with a coating layer of HZSM-5 zeolite powder ion-exchanged with palladium, with the proviso that the inner layer is other than the material of the outer layer.

5. The exhaust treating body of claim 4, wherein the inner layer is selected from the group consisting of HZSM-5 zeolite ion-exchange with copper, zeolite ion-exchanged with cooper, molecular sieve powder ion-exchanged with copper and HZSM-5 zeolite.

6. The exhaust treating body of claim 4, wherein the inner layer is HZSM-5 zeolite powder ion-exchanged with copper.

7. In a process for making an exhaust treating body for adsorbing hydrocarbons from an internal combustion engine exhaust gas wherein a monolith carrier is coated with a first layer of HZSM-5 zeolite powder ion-exchanged with palladium, which in turn is overcoated with a coating layer of a zeolite powder other than that of the first layer, the improvement comprising forming the first coating layer by firing a powder comprising HZSM-5 zeolite ion-exchanged with palladium at a temperature not less than 600° C. in air for not less than two hours.

8. The process of claim 7, wherein the HZSM-5 zeolite powder ion-exchanged with palladium is fired before applying said powder to the monolith carrier.

9. The product prepared by the process of claim 8.

10. The process of claim 7, where the HZSM-5 zeolite powder ion-exchanged with palladium is fired after applying said powder to the monolith carrier.

11. The product prepared by the process of claim 10.

12. In a process for making an exhaust creating body for adsorbing hydrocarbons from an internal combustion engine exhaust gas wherein a monolith carrier is coated with a first layer of a zeolite powder, which in turn is overcoated with a layer of HZSM-5 zeolite powder ion-exchanged with palladium, with the proviso that the inner layer is other than the material of the outerlayer, the improvement comprising forming the outerlayer by firing a powder comprising HZSM-5 zeolite ion-exchanged with a palladium at a temperature of not less than 600° C. in air for not less than two hours.

13. The process of claim 12, wherein the HZSM-5 zeolite powder ion-exchanged with palladium is fired before applying said powder of the monolith carrier.

14. The product prepared by the process of claim 13.

15. The process of claim 12, wherein the HZSM-5 zeolite powder ion-exchanged with palladium is fired after applying said powder to the monolith carrier.

16. The product prepared by the process of claim 15.

* * * * *